2,776,878

FUEL OIL ADDITIVES

Harry W. Rudel, Roselle Park, and Marion Gargisa, Elizabeth, N. J., assignors to Esso Research and Engineering Company, a corporation of Delaware No Drawing. Application April 19, 1952,
Serial No. 283,253

8 Claims. (Cl. 44—70)

This invention concerns a novel composition prepared by reacting an alkali or alkaline earth metal petroleum sulfonate with a water soluble, low molecular weight carboxylic compound. More particularly, it relates to the product formed by reacting an alkali or alkaline earth metal petroleum sulfonate with a water soluble, low molecular weight carboxylic acid or carboxylate. Suitable carboxylic compounds are characterized as being low molecular weight carboxylic acids and carboxylates that possess the ability to inactivate iron as a catalyst for the catalytic decomposition of hydrogen peroxide. This invention further concerns a novel composition consisting of hydrocarbon oil and particularly a hydrocarbon fuel oil containing hydrocarbons derived from cracking operations in combination with a reaction product of the type described above.

It is an object of the present invention to produce hydrocarbon fuel oils of improved stability, in that sediment is not formed in these oils. The term "fuel oils" refers to those hydrocarbon mixtures which are employed in various burner systems such as diesel fuels and domestic and industrial heating oils. In this connection, fuel oils may be derived from petroleum by a variety of methods including straight run distillates from crude petroleum oil, and thermal or catalytic cracking of petroleum oil fractions.

It has been found that fuel oils consisting completely or in part of cracked stocks are characterized by undesirable instability, giving rise to the formation of sediment. As a result, such fuels may cause clogging of filters, orifices, or conduits associated with the burner systems in which they are employed.

In accordance with this invention, it has been established that instability of cracked fuel oils may be substantially overcome by incorporating therein small quantities of a material formed by reacting an alkali or alkaline earth metal petroleum sulfonate and a water-soluble low molecular weight carboxylic acid or a water-soluble salt of such an acid.

Heating oils which may be stabilized by the additives described in this invention are hydrocarbon mixtures of which more than about 10% consist of stocks derived from thermal or catalytic cracking operations. More precisely still, the stocks may be characterized as petroleum fractions containing a portion of cracked stocks greater than 10% and falling within ASTM specification D–975–48T for diesel fuel oils (grades #1–D to 4–D inclusive) and ASTM specification D–396–48T for fuel oils (grades #1 to 6 inclusive). With reference first to the novel compositions which are to be incorporated in unstable fuel oils, it will be first noted that these materials are the products formed by reacting an alkali or alkaline earth metal petroleum sulfonate and a salt of a low molecular weight carboxylic acid, or the acid itself. These materials are prepared by adding an aqueous solution of a carboxylic compound to a sulfonate which is in oil solution and heating the mixture to a temperature sufficient to drive off water. Temperatures of 200°–250° F. are generally sufficient for this purpose. The amount of carboxylic compound employed in this reaction is from 2 to 30% by weight of the sulfonate and preferably from 5 to 20%. An inert gas such as nitrogen may be passed through the reactants during the reaction to assist in removing the water. The oil solution of the reaction products may then be filtered, centrifuged, or otherwise treated to remove any insoluble materials such as unreacted acid or salt. The oil solvent is preferably an oil of good quality, for example a solvent extracted paraffinic or mid-continent oil falling within a viscosity range at 210° F. of 30 to 120 S. U. S.

The alkali or alkaline earth metal petroleum sulfonate to be used is well known to the art and is generally designated in this manner. The sulfonate may be formed by reaction of a metal base with sulfonic acids produced by the reaction of strong sulfuric acid and petroleum oil. Some sulfonates are best prepared by double decomposition of an alkali metal sulfonate and a salt of another metal, sch as calcium chloride. To insure oil solubility, the petroleum sulfonic acids employed in accordance with this invention must have a molecular weight of at least 250. The preferred range of molecular weights is from about 300 to 550. Sodium, potassium, calcium, barium, magnesium, etc. petroleum sulfonates may be used.

Carboxylic acids or salts thereof to be reacted with the sulfonate are preferably those containing from 2 to about 10 carbon atoms. These carboxylic compounds are further characterized as being those acids and salts that are capable of inhibiting the catalytic decomposition of hydrogen peroxide where iron is employed as the catalyst. Iron in ionic form is generally considered to be the catalyst for this reaction. The mechanism by which these compounds inhibit this particular reaction is not completely understood, but it is felt that they render ionic iron inactive as a catalyst by forming a coordination complex or an insoluble iron compound. In any event, the ability of these compounds to inhibit this reaction has been found to be a criterion for predicting their satisfactory performance for the purposes of the present invention.

Preferred carboxylic compounds are the water soluble salts, for example the sodium, potassium, lithium, ammonium, and magnesium salts of the carboxylic acids described above. Substituted carboxylic compounds such as amino and hydroxy carboxylic acids and their salts are particularly effective carboxylic compounds. The carboxylic acids further can be aliphatic, aromatic, alicyclic or heterocyclic in structure. Particularly preferred compounds are the sodium and potassium salts of citric acid, tartaric acid, salicylic acid, and benzoic acid. Generally speaking, the ammonium, alkali metal and alkaline earth metal salts of carboxylic acids which are water soluble and which will inhibit the iron-catalyst decomposition of hydrogen peroxide, are suitable for use in the compositions of the present invention.

The sulfonate-carboxylate reaction product is usually prepared as the concentrate of the active ingredient in an oil vehicle. In the data which follow in this specification, it is to be understood, however, that while this reaction product is employed as an oil concentrate, the amount given corresponds to the actual weight of active ingredient and not to the weight of the composition including the vehicle.

It will be noted that alkali or alkaline earth metal petroleum sulfonates alone do not inhibit sediment formation in fuel oils. It will further be noted that the low molecular weight carboxylic acids and their salts are not in themselves soluble in petroleum fuels. The products formed by reacting a sulfonate and a carboxylate of the types described in this invention, however, are sufficiently soluble in petroleum fuels and do inhibit sediment formation. In all probability the sulfonate to some extent serves as a solubilizer for the carboxylate.

In general, not more than about 0.5 weight percent of the additives of this invention is required in a fuel oil and about 0.05 weight percent or even less is usually effective in stabilizing a fuel oil. As little as 0.005% may be effective in some oils. It is to be understood that other known additives may, if desired, be also incorporated in a heating oil in a conventional manner. Thus, if desired, mutual solvents such as glycol ethers may be added. Metallic phenolates, phenol sulfides, phosphate and thiophosphate esters, and other conventional additives may also be employed. It is particularly contemplated that rust inhibitors be included in the fuel oils of this invention. Examples of such rust inhibitors are the metal salts of naphthenic acids, sorbitan esters, esters of pentaerythritol, and salts of alkyl phosphoric acids.

The nature of this invention will be fully understood from the following example:

*Example I*

A conventional heating oil was tested for stability as the oil was received and after addition of various types of additives to the oil. The oil was a blend consisting of 20% to 30% by volume catalytically cracked stock, 50% to 40% by volume thermally cracked stock, and 30% virgin stock by volume. Typical inspections of this type of oil are as follows:

| | |
|---|---|
| Gravity, ° API | 34.1 |
| Color (tag Robinson) | 11¾ |
| Flash, ° F | 158 |
| Sulfur, percent | 0.56 |
| Aniline point, ° F | 130 |
| Neutralization No | 0.07 |
| Dist. I. B. P. (° F.) | 342 |
| 10% | 420 |
| 50% | 484 |
| 90% | 576 |
| F. B. P | 628 |
| Carbon residue on 10% bottoms | 0.082 |

In a series of stability tests which were conducted, reaction products of various carboxylates and sodium petroleum sulfonate were added to samples of this heating oil and sodium petroleum sulfonate alone was added to the heating oil. The resulting heating oil compositions were then tested for stability in a test in which the heating oil was stored for a period of 16 hours while being maintained at a temperature of 210° F. At the end of this time, the heating oil was filtered, and the amount of sludge accumulating during the storage period was then quantitatively determined. The results of these tests are indicated in the table below:

TABLE 1

*Heating oil stability tests*

[Blends of 0.02 wt. percent of additive in heating oil]

| Salt in Combination with Sulfonate | 16 Hours at 210° F. (mg. Insoluble per 600 g. Oil) |
|---|---|
| Sodium Citrate | 2 |
| Sodium Tartrate | 4 |
| Sodium Acetate | 12 |
| Sodium Oxalate | 35 |
| Sodium Salicylate | 3 |
| Sodium Benzoate | 9 |
| None (Sulfonate Alone) | 30 |
| Uninhibited Heating Oil | 30 |

Referring to the table, it will be noted that the uninhibited heating oil was of the nature to provide 30 mg. of sludge per 600 g. of the heating oil during the 16 hour stability test. This is an amount of sediment or sludge which indicates an oil of unsatisfactory stability. Even when 0.02 wt. percent of sodium petroleum sulfonate was included in the heating oil, no improvement in stability was achieved. However, when 0.02 wt. percent of the reaction products formed by reacting selected sodium carboxylates and sodium sulfonate was added to the oil, the sludge formation was remarkably decreased, showing that the oil was substantially stabilized. It will be further noted that when the reaction product formed by reacting sodium oxalate and sodium sulfonate was added to the heating oil, no improvement in stability was achieved, and in fact, the resulting sludge formation was somewhat worse than when no additive was employed. This fact substantiates the statement made earlier in this specification to the effect that the alkali carboxylate must be of a type that inhibits the iron-catalyzed decomposition of hydrogen peroxide. Sodium citrate, sodium tartrate, sodium acetate, sodium salicylate, and sodium benzoate are characterized by the fact that they possess this property. Further, it will be noted that sodium citrate, sodium tartrate, and sodium salicylate are especially effective in preventing sediment formation. This fact indicates that the salts of hydroxy carboxylic acids of the types described above exhibit the highest degree of inhibition.

It is obvious that numerous variations are possible without departing from the scope of the present invention. For example, mixtures of the carboxylic compounds may be employed; amino and other polar groups may be substituted wholly or partially for the hydroxy groups of the various hydroxy compounds; and these additives may be applied to other products such as lubricating oils, greases, and the like.

What is claimed is:

1. A hydrocarbon fuel oil composition comprising at least in part hydrocarbons derived from a cracking operation and also an amount of the product which is formed by adding about 100 parts by weight of an oil soluble petroleum sulfonate in oil solution to about 2 to 30 parts by weight of a water soluble carboxylic compound in aqueous solution and thereafter heating the resulting sulfonate and carboxylic compound mixture at a temperature sufficient to drive off the water therefrom, said sulfonate being derived from the sulfonic acid of at least 250 mol. wt. and being selected from the group consisting of the oil soluble alkali and alkaline earth metal petroleum sulfonates, said carboxylic compound being selected from the class consisting of the ammonium, alkaline earth and alkali salts of citric, tartaric, acetic, salicyclic and benzoic acids, the amount of said product in said fuel oil composition being less than 0.5% by weight of said composition, but sufficient to prevent sediment formation within the composition.

2. A fuel oil composition as defined in claim 1 in which the sulfonic acid has a molecular weight within the range of about 300 to 550.

3. A fuel oil composition as defined in claim 2 in which the sulfonate-carboxylic compound product constitutes about 0.02 weight percent of the fuel oil composition.

4. A fuel oil composition as defined in claim 3 in which the fuel oil is a heating oil boiling in the range from about 342° to 628° F.

5. A composition as defined in claim 2 in which the carboxylic compound is an alkali metal salt of citric acid.

6. A composition as defined in claim 2 in which the carboxylic compound is an alkali metal salt of tartaric acid.

7. A composition as defined in claim 2 in which the carboxylic compound is an alkali metal salt of benzoic acid.

8. A composition as defined in claim 2 in which the carboxylic compound is a nalkali metal salt of salicyclic acid.

References Cited in the file of this patent

UNITED STATES PATENTS

Re. 23,082   Zimmer et al.   Jan. 25, 1949